(12) United States Patent
Meritt (10) Patent No.: US 7,370,605 B2
(45) Date of Patent: May 13, 2008

(54) ANIMAL FEEDING APPARATUS (76) Inventor: Rick Meritt, 5197 FM 2685, Gilmer, TX (US) 75645

( * ) Notice: Subject to any disclaimer, the term of this patent is extended or adjusted under 35 U.S.C. 154(b) by 0 days.

(21) Appl. No.: 11/160,611

(22) Filed: Jun. 30, 2005

(65) Prior Publication Data
US 2005/0229860 A1 Oct. 20, 2005

Related U.S. Application Data (63) Continuation of application No. 09/920,231, filed on Aug. 1, 2001, now Pat. No. 6,920,841.

(51) Int. Cl.
A01K 5/00 (2006.01)
A10K 5/02 (2006.01)

(52) U.S. Cl. ...................... 119/51.01; 119/53
(58) Field of Classification Search ............ 119/51.01, 119/52.1, 57.91, 53
See application file for complete search history.

(56) References Cited

U.S. PATENT DOCUMENTS

| | | | |
|---|---|---|---|
| 485,142 A | 10/1892 | Stephens | |
| 1,214,881 A | * 2/1917 | Berntzen | ...................... 239/66 |
| 1,355,399 A | * 10/1920 | Kelley | ...................... 119/57.91 |
| 2,454,721 A | 11/1948 | Severance et al. | |
| 2,619,252 A | 11/1952 | De Hoffmann | |
| 2,638,871 A | 5/1953 | Ruedemann | |
| 2,808,029 A | 10/1957 | Geerling | |
| 2,886,002 A | 5/1959 | O'Malley et al. | |
| 2,988,047 A | 6/1961 | Hurdle | |
| 3,034,480 A | * 5/1962 | French | ...................... 119/57.91 |
| D194,594 S | 2/1963 | Juculano | |
| 3,730,142 A | 5/1973 | Kahrs et al. | |
| 3,780,701 A | 12/1973 | Wentworth, Sr. | |
| 4,328,880 A | 5/1982 | Lapeyre | |
| 4,538,548 A | 9/1985 | Page | |
| 4,580,528 A | 4/1986 | Kendall | |
| 4,601,414 A | 7/1986 | Lawson | |
| 4,719,875 A | 1/1988 | Van Gilst | |
| 4,815,621 A | 3/1989 | Bartis | |
| 4,986,220 A | 1/1991 | Reneau et al. | |
| 5,069,164 A | 12/1991 | Wiwi | |
| 5,086,730 A | 2/1992 | Figley | |

(Continued)

FOREIGN PATENT DOCUMENTS

GB 2129266 A * 5/1984

OTHER PUBLICATIONS

"Welding," Microsoft Encarta Online Encyclopedia 2002; http://encarta.msn.com (1997-2002) Microsoft Corporation.

(Continued)

Primary Examiner—Son T. Nguyen
(74) Attorney, Agent, or Firm—Gardere Wynne Sewell, LLP (57) ABSTRACT Gravity flow animal feed dispensing apparatus includes feed supply tubes depending from a bottom wall of a feed storage hopper supported by a frame elevated above ground level. Feed dispensing tubes or a plate are connected to the feed supply tubes and flow control baffles and/or a flow control valve limit the dispensation of feed. A wildfowl embodiment of the apparatus includes an access control cage disposed about the feed dispensing member. The orientation of the feed supply tubes and dispensing tubes may be varied to provide access to feed by animals of various sizes and to provide for placement of the apparatus adjacent a confinement wall or fence.

21 Claims, 7 Drawing Sheets

U.S. PATENT DOCUMENTS

| | | | |
|---|---|---|---|
| 5,195,459 A | | 3/1993 | Ancketill |
| 5,275,131 A | | 1/1994 | Brake et al. |
| 5,339,996 A | | 8/1994 | Dubbert et al. |
| 5,435,267 A | | 7/1995 | Patterson |
| 5,503,090 A | * | 4/1996 | Guzan ......................... 111/7.2 |
| D371,228 S | | 6/1996 | Monin |
| 5,570,547 A | | 11/1996 | Webb et al. |
| 5,740,757 A | | 4/1998 | Smeester |
| D397,527 S | | 8/1998 | Bruder et al. |
| 5,794,561 A | | 8/1998 | Schulz |
| 5,906,174 A | | 5/1999 | Muldoon |
| 6,073,587 A | | 6/2000 | Hill et al. |
| 6,082,300 A | | 7/2000 | Futch |
| 6,199,509 B1 | * | 3/2001 | Mostyn et al. ............ 119/51.01 |
| 6,510,813 B1 | * | 1/2003 | Boone, Jr. ................ 119/57.91 |
| 2006/0048712 A1 | * | 3/2006 | Boyer ...................... 119/57.91 |

OTHER PUBLICATIONS

"Introduction to Welding," Materials Engineering Group.; Copyright 1997 Materials Engineering (UK) Ltd.; ttp://www.meg.co.uk/meg/app01.htm.

Advertisement (Mumme's Inc.) (1 page), The Journal of the Texas Trophy Hunters Association, Jan./Feb. 2005, on reverse side of p. 74.

Advertisement (Mumme's Inc.) (1 page), Texas Deer Association Tracks, vol. 6, Issue 3 (May/Jun. 2005), p. 51.

Advertisement (American Hunter Outdoor Products) (1 page), The Journal of the Texas Trophy Hunters Association, May/Jun. 2005, on reverse side of p. 155.

Advertisement (Atascosa Wildlife Supply) (2 pages); The Journal of the Texas Trophy Hunters Association, May/Jun. 2005, (reverse sides of pp. 23 and 26).

Internet web site (Atascosa Wildlife Supply) (2 pages); http://www.atascosawildlifesupply.com/feeders.html (Mar. 8, 2005).

Internet web site (American Hunter Outdoor Products) (15 pages); http://www.americanhunterfeeders.com (Feb. 24, 2005).

Internet web site (Mumme's Inc.) (1 page); http://www.mummesinc.com (Feb. 24, 2005).

Internet web site (Boss Game Systems) (3 pages); http://www.bossgamesystems.com (Oct. 6, 2005).

Advertisement (Sweeney Automated Feeding Systems) (2 pages, front and back) (date referenced Jan. 1-Feb. 28, 2005).

Advertisement (Texas Wildlife Supply) (1 page), The Journal of the Texas Trophy Hunters Association, May/Jun. 2005 (reverse side of p. 174).

* cited by examiner

ANIMAL FEEDING APPARATUS

CROSS-REFERENCE TO RELATED APPLICATION

This application is a continuation in part of application Ser. No. 09/920,231 filed Aug. 1, 2001, now U.S. Pat. No. 6,920,841.

BACKGROUND OF THE INVENTION

Various types of animal feeders have been developed for unattended feeding of domestic animals and animals in the wild. My prior application Ser. No. 09/920,231, discloses, for example, an animal feeding apparatus having improved construction and being adapted for gravity flow feeding of animals in the wild, including deer and other desirable game animals, for example. The apparatus described and claimed in my prior application is particularly advantageous in its simplicity and durability as, among other things, it relies on gravity flow to dispense feed to various types of animals.

However, there has been a continuing need for improvements in such feeding devices, including improvements in means for controlling the rate of flow of feed being dispensed, and access to the feeding apparatus by hoofed animals and fowl of different types and sizes, for example, so that such animals have better access to the feed. There has also been a need for improvements in feeding devices which will protect the feed from the elements and feeding devices which may be adapted for placement at the fence or barricade of an enclosed habitat, for example. These and other desiderata in the art of animal feeding apparatus have been met by the present invention.

SUMMARY OF THE INVENTION

The present invention provides improved animal feeding apparatus for use in substantially unattended feeding of domestic as well as wild animals, including game animals and various game birds, for example.

In accordance with one aspect of the present invention an improved gravity flow feeding apparatus is provided wherein an arrangement of feed supply tubes and feed flow control devices is provided, wherein the feed is protected from moisture contamination and feed is not lost to spillage from the feeding apparatus. Still further, a feeding apparatus is provided which may be modified to feed animals of different sizes selectively or at the same time.

In accordance with one preferred embodiment of the invention, a feeding apparatus comprising a gravity flow hopper with plural circumferentially spaced, depending gravity flow, feed supply tubes is provided and wherein each tube includes feed flow control and feed containment means of an improved and unique configuration.

In accordance with another preferred embodiment of the invention, a gravity flow animal feeding apparatus is provided which includes feeding stations which are adapted for animals of different sizes so that young or undersized animals, for example, may have access to feed, at will, and while other and larger animals are also feeding. Improved flow control means for feed supply tubes or conduits of the apparatus is provided to adjust the feed flow rate for pelletized or granular feeds, such as shelled corn and manufactured feeds.

In accordance with still another preferred embodiment of the invention, an animal feeding apparatus is provided which is particularly adapted for placement in an enclosed habitat which may not be easily accessible or may be hazardous to humans entering the habitat.

Still further, a preferred embodiment of the invention is particularly adapted for feeding wildfowl of different types and sizes whereby a variety of fowl may feed simultaneously or at least be protected from predators while feeding.

Those skilled in the art will further appreciate the advantages and superior features of the invention mentioned above together with other important aspects upon reading the detailed description which follows in conjunction with the drawings.

DETAILED DESCRIPTION OF THE PREFERRED EMBODIMENTS

In the description which follows like parts are marked throughout the specification and drawings with the same reference numerals, respectively. The drawings figures may not necessarily be to scale and certain elements may be shown in generalized or somewhat schematic form in the interest of clarity and conciseness.

Figure 1:
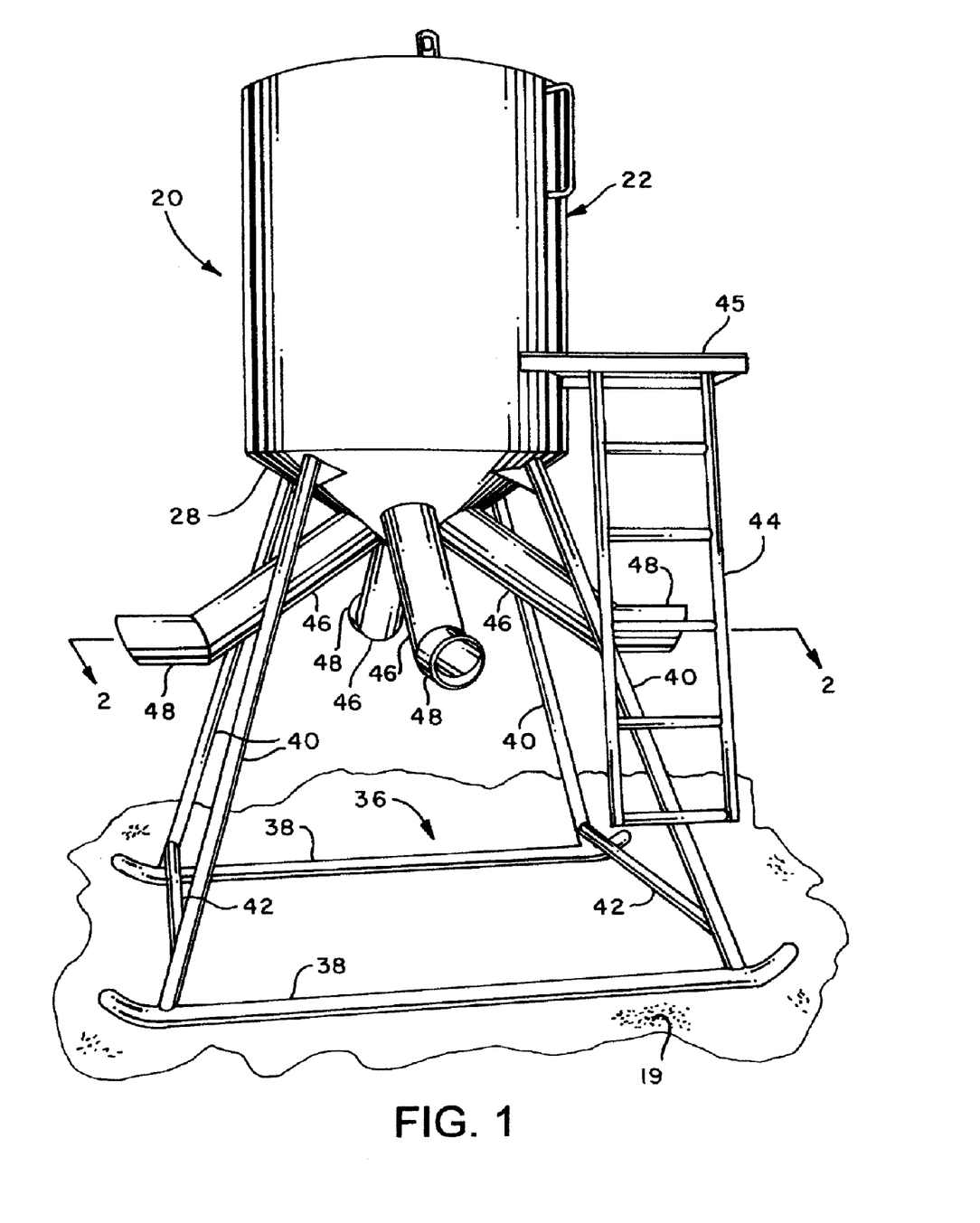
FIG. 1 is a perspective view of one preferred embodiment of an animal feeding apparatus in accordance with the invention.

Referring to FIG. 1, there is illustrated an animal feeding apparatus in accordance with the invention and generally designated by the numeral 20. The apparatus 20 is adapted for substantially unattended feeding of hoofed animals including, for example, deer, elk and various exotic animals, as well as domesticated animals. In particular, the apparatus 20 is useful as a deer feeder. The apparatus 20 is characterized by an upstanding cylindrical, steel hopper 22, see FIG. 2 also, having a generally cylindrical sidewall 24, a transverse top wall 26 and a frustoconical depending bottom wall 28, including a transverse wall portion 29. Bottom wall 28 preferably forms an angle "x" with vertical sidewall 24 in the range of about forty-five to fifty degrees and which is particularly useful for gravity flow of granular feed, including shelled corn and manufactured feeds including, for example protein supplement pellets. Hopper 22 is also advantageously provided with a hinged breathing type lid or cover 30 disposed on top wall 26 and provided with hinge means 32. Cover 30 is shown disposed over a flanged opening 34 and is constructed similar to the cover or lid disclosed and claimed in the above-referenced patent application.

Figures 2, 3, 4:
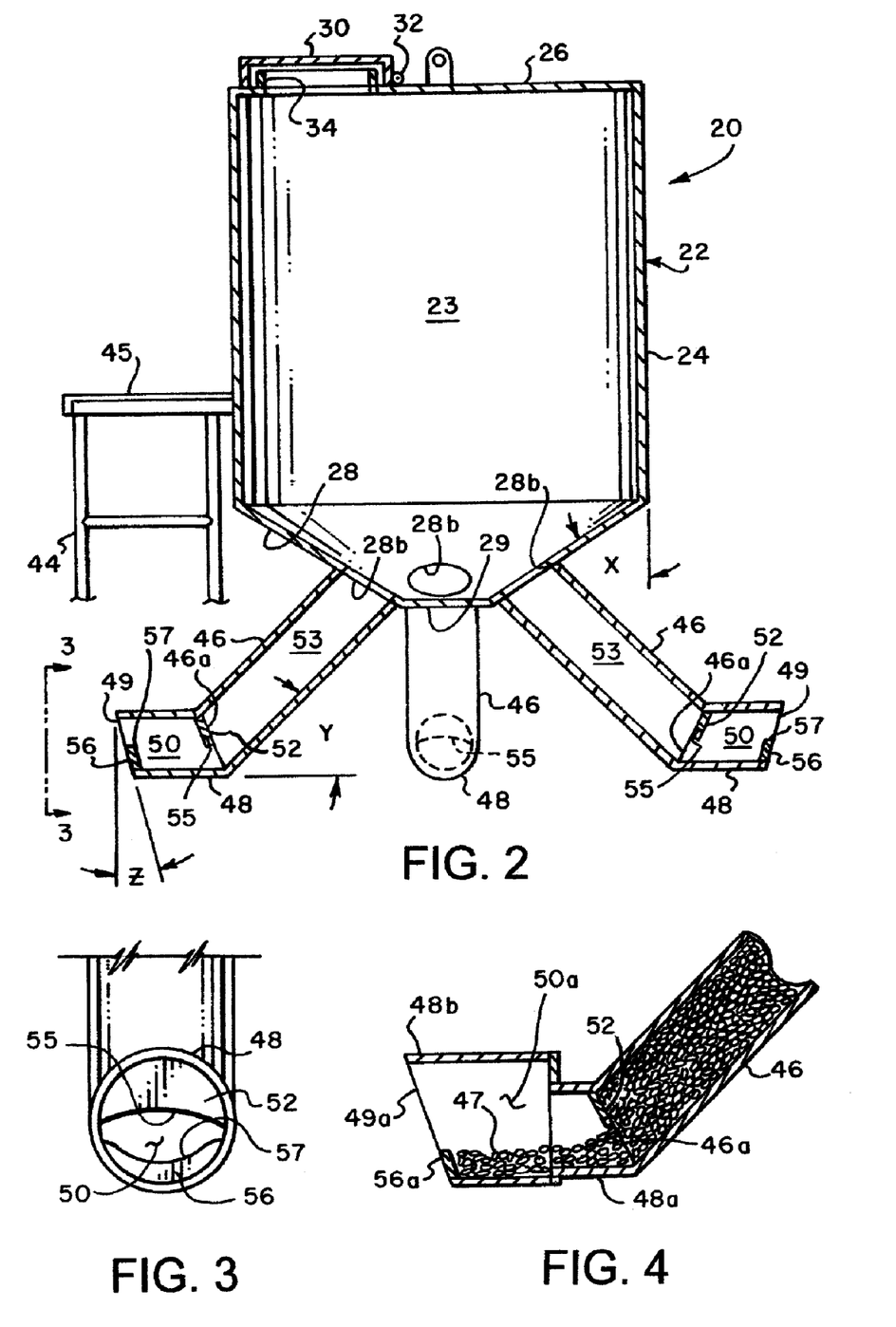
FIG. 2 is a section view taken generally along the line 2-2 of FIG. 1.
FIG. 3 is a detail view taken generally from the line 3-3 of FIG. 2.
FIG. 4 is a detail section view illustrating a modified feed tube configuration for use with animal feeding apparatus in accordance with the invention.

Referring further to FIGS. 1 and 2, apparatus 20 is preferably skid-mounted and hopper 22 is mounted on a skid assembly 36, FIG. 1, including spaced apart tubular skid members 38 and upstanding support legs 40 which are arranged in a generally rectangular or square pattern. Suitable cross braces 42 may interconnect adjacent ones of the legs 40, as illustrated in FIG. 1. Hopper 22 is accessible by way of a boarding ladder 44 connected to a platform 45 suitably mounted on the hopper 22 adjacent the flanged opening 34 to provide access to the hopper for loading feed into interior space 23, see FIG. 2.

Referring further to FIGS. 1 and 2, the feeding apparatus 20 is provided with plural circumferentially spaced, depending feed supply tubes 46 which are each connected or formed integral with a generally horizontally extending feed dispensing tube part 48, as shown. Feed supply and dispensing tubes 46 and 48 are preferably of the same diameter although the diameters of the dispensing tubes 48 may be modified, as will be described further herein.

Referring further to FIG. 2, the feed supply tubes 46 are connected to frustoconical bottom wall 28 in a generally rectangular pattern, preferably equally spaced apart about the bottom wall, as illustrated. Depending feed supply tubes 46 preferably make an angle "y" with the horizontal, which angle is preferably in the range of about forty to fifty degrees. Feed dispensing tubes 48 extend substantially horizontally from a juncture 46a with tubes 46, respectively, and are scarfed at their distal ends 49, respectively, to form an angle "z" from the vertical, FIG. 2, preferably of about twenty-five degrees, to minimize contamination of feed disposed within interior space 50 of the feed dispensing tubes 48 from snow or rain.

Each feed supply and dispensing tube assembly, comprising tubes 46 and 48, is provided with flow control means including a baffle 52, as shown in FIG. 2, comprising a substantially semicircular plate suitably disposed in interior space 50, 53 of supply and dispensing tube assemblies 46, 48 and preferably at or closely adjacent to the juncture or intersection 46a of the tubes 46 and 48, as illustrated. Flow control baffles 52 have a geometry whereby they substantially block the upper 50% of the flow passages formed by the spaces 53 and 50, as illustrated in FIG. 3, but are formed with a slight concavity as indicated by the arcuate edge 55, FIG. 3.

Still further, each of the feed dispensing tubes 48 is provided with flow control means including a feed dispensing baffle 56, FIGS. 2 and 3, comprising an arcuate plate part disposed just within the distal end 49 of the dispensing tube 48 and suitably secured thereto to form a dam to prevent flow of feed out of the open end of the tube part 48, but to provide enough space to allow an animal's muzzle to protrude within the space 50 to gain access to feed disposed therein. In other words, a quantity of feed is normally present in space 50 between baffle or dam 56 and flow control member 52 due to gravity flow from the space 23 through openings 28b in wall 28, and into the spaces 53 and 50, but members 52 and 56 prevent continuous flow of granular feed, such as corn and manufactured feeds in pelletized form, such as protein supplement pellets, out through tube distal ends 49. For example, for a feed dispensing tube having an inside diameter of about six inches, the height of the dispensing baffle 56 is about one inch and the height of the flow control baffle 52 is slightly less than three inches at the center of the concavity formed by the edge 55. In this way, the space 50 may be at least partially occupied by animal feed, but the feed will not flow over the baffle or dam 56 onto the ground and thus be lost due to contamination and environmental damage. For the above-mentioned dimensions the spacing between baffles 52 and 56 is preferably about 6.5 inches. Accordingly, an improved animal feeding apparatus 20 is provided wherein long term unattended use of the device or apparatus may be carried out while feed is available for animals with minimal effort and minimal chance of contamination or loss of feed except through consumption. In other word, as an animal, such as a deer needs access to feed in the space 50 and as feed is depleted, more will flow past the baffle or flow control dam 52 into the space 50, but not sufficiently as to flow over the edge 57, FIG. 3, of the baffle or dam 56.

The apparatus 20 may be fabricated of conventional corrosion resistant steel or plated or painted steel using conventional manufacturing techniques. Construction may comprise essentially welding of all components to each other for simplicity of fabrication and low maintenance. For apparatus 20 having six inch diameter feed supply and dispensing tubes 46 and 48, the overall length of tubes 46 and 48 is preferably about 31 inches and about 8 inches, respectively, and the height and diameter of hopper 22 is about 48 inches and about 44 inches. It is understood that feed supply and dispensing tubes 46 and 48 may vary in length and diameter. Similarly, it is understood that the height and diameter of hopper 22 may vary, depending on the desired capacity of the hopper. For example, in one embodiment of the present invention, feed hopper 22 has a height of about 24 inches and a diameter of about 44 inches. In another embodiment of the present invention, feed hopper 22 has a height of about 48 inches and a diameter of about 54 inches.

In certain applications of feeding apparatus, such as the apparatus 20, large animals may be present and have a muzzle sufficiently large as to prevent gaining access to the space 50 through the distal end 49 of the feeding tube assemblies illustrated in FIGS. 2 and 3. Accordingly, the feeding tube assemblies formed by the tubes 46 and 48 may be modified by providing an enlarged tube section 48b, FIG. 4, suitably connected to a modified tube section 48a and provided with a feed dispensing baffle or dam 56a of proper proportions for the enlarged diameter feeding tube section 48b. In this way, a larger opening at distal end 49a is provided for large animals to gain access to feed, such as pelletized feed 47 disposed in space 50a, as illustrated. Feed 47 is retained by baffle or dam 56a and flow control of feed 47 within tube 46 is provided by the flow control baffle or plate 52, as illustrated. Accordingly, a feeding apparatus, such as the apparatus 20 may be modified to provide enlarged diameter feed dispensing tubes, such as tubes 48b, or selected ones of the feed dispensing tubes may be modified for larger animals, for example.

Figure 5:
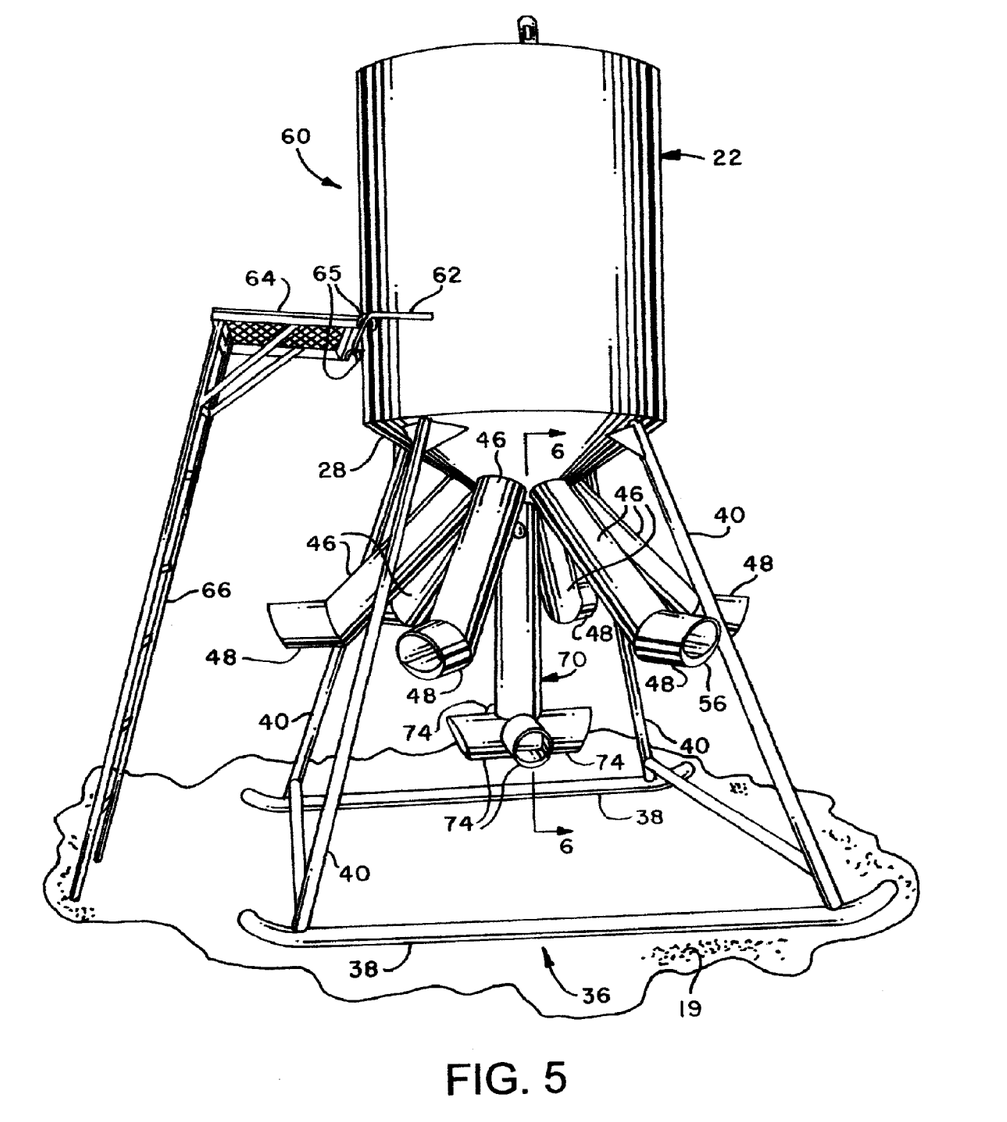
FIG. 5 is a perspective view of another preferred embodiment of an animal feeding apparatus in accordance with the invention.
Figure 6:
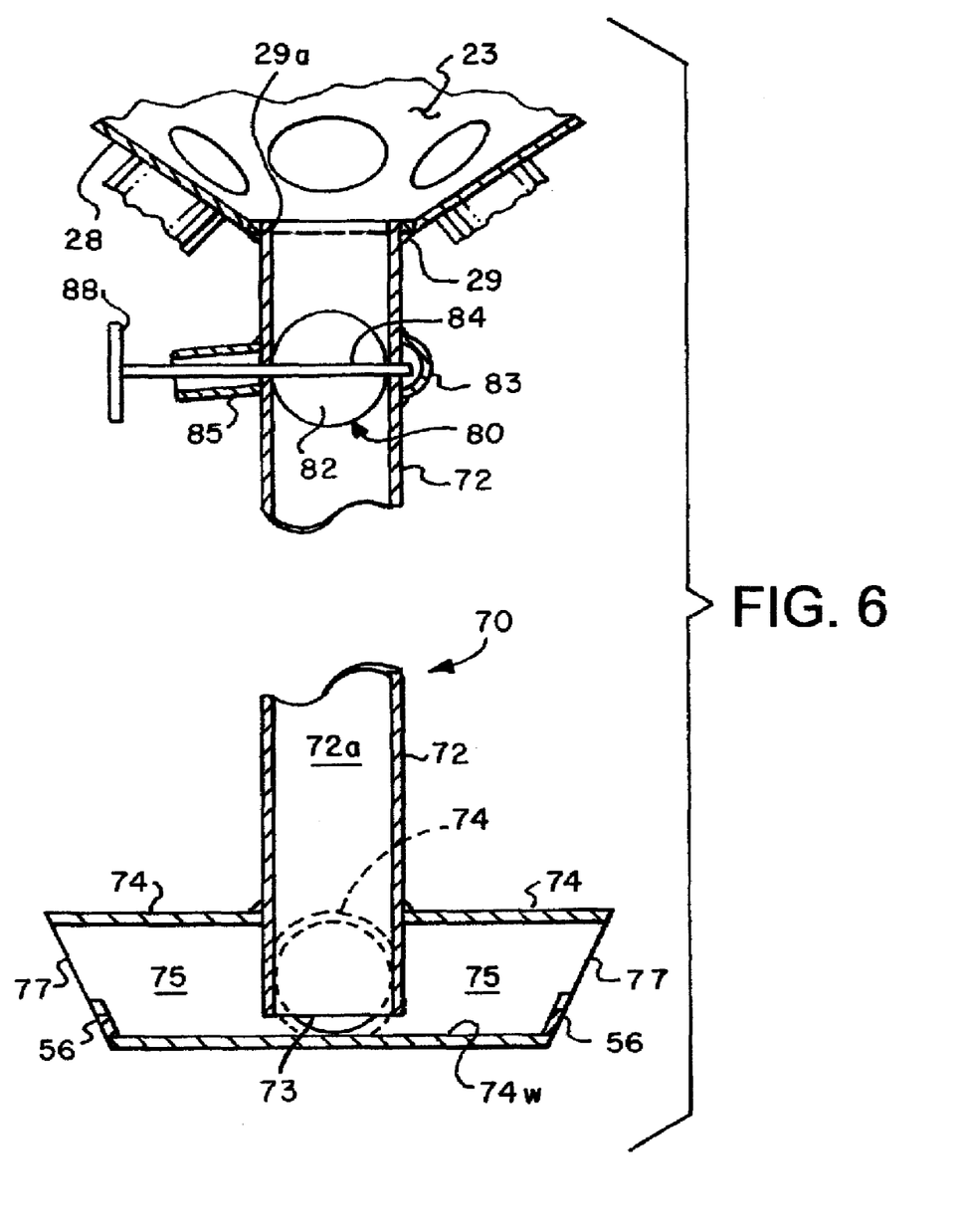
FIG. 6 is a section view taken generally along the line 6-6 of FIG. 5.

Referring now to FIGS. 5 and 6, another preferred embodiment of a feeding apparatus in accordance with the invention is illustrated and generally designated by the numeral 60. The feeding apparatus 60 is similar in some respects to the apparatus 20, relies on gravity feed flow and may utilize a hopper 22, or a similar and larger hopper, supported on a skid assembly 36 in substantially the same manner as the apparatus 20. Apparatus 60 may be modified to eliminate the integral access platform 45 on the outer sidewall of the hopper 22 and replace such with a suitable somewhat U-shaped bail 62 for releasably supporting a portable platform 64 and access ladder 66. Platform 64 is provided with spaced apart hook members 65, as shown in FIG. 5, to be hooked over bail 62 when access to the hopper 22 is required for replenishment of feed within the space 23, for example. Hopper 22 is also modified with respect to frustoconical bottom wall 28 by providing a total of six, equally spaced, downwardly projecting feed supply tubes 46 and including integrally formed feed dispensing tubes 48. Accordingly, apparatus 60 may feed several animals at one time and the height of the feed dispensing tubes 48 above ground is preferably about 36 inches (as measured from the ground to the bottom of the feed dispensing tube) for animals, such as deer, for example. However, the height of the tubes 48 from ground level is too high, for example, for fawns to feed, as well as other young animals which may desire to feed from the apparatus 60. In this regard, the apparatus 60 is provided with a young or small animal feed dispensing assembly, generally designated by the numeral 70, comprising a substantially vertical feed supply tube 72, see FIG. 6, depending from and connected to frustoconical bottom wall 28 at transverse wall 29. Wall 29 is provided with a suitable opening 29a formed therein to provide access to interior space 23 for dispensing feed through supply tube 72.

Small or young animal feed dispensing assembly 70 is provided with plural circumferentially spaced feed dispensing tubes 74, see FIGS. 5 and 6, which are preferably disposed at right angles to each other and are also oriented such that they do not all project in alignment with the feed dispensing tubes 48. For example, viewing FIG. 6, feed dispensing tubes 74 may be oriented in an array in the plane of FIG. 6 and normal to the plane of FIG. 6, while two feed dispensing tubes 48 project opposite each other in the plane of drawing FIG. 6 and tubes 48 are circumferentially spaced at sixty degree intervals, respectively. Accordingly, at least selected ones of the feeding dispensing tubes 74 may be positioned between feed dispensing tubes 48 to allow small animals easier access to the feed dispensing tubes 74. Moreover, the feed dispensing tubes 74 are disposed substantially entirely under the hopper 22 whereas the feed dispensing tubes 48 project outwardly from the support legs 40, as illustrated, thereby minimizing the risk of small or young animals being trampled by large animals while feeding.

As shown in FIG. 6, depending feed supply tube 72 terminates at a distal end 73 spaced a predetermined distance above a bottom wall 74w of feed tubes 74 to form a space allowing controlled flow of feed into spaces 75 of the respective feed dispensing tubes 74, which spaces are delimited by the feed dispensing baffles or dams 56 in the same manner as for the feed tubes 48. Feed dispensing tubes 74 are also scarfed at an angle corresponding to angle "z" for the feed tubes 48 so that their distal ends 77, respectively, provide openings into the spaces 75, but also shelter the feed within the spaces 75 from rain or snow, for example.

Flow control of feed through the interior space 72a of supply tube 72 is accomplished by a suitable flow control valve 80, FIG. 6, which flow control valve is preferably of the so-called butterfly type having a generally circular disk closure member 82 disposed in passage or space 72a and supported on a rotatable shaft 84. Shaft 84 is supported in cooperating bores formed in supply tube 72, one of which is closed by a cap 83 and the other of which is shielded from the elements by a tubular cover 85 projecting opposite from the cover or cap 83. Covers 83 and 85 may be suitably welded to the exterior of the tube 72. Shaft 84 terminates in a T-shaped handle 88 whereby rotatable adjustment of the valve closure member or disk 82 may be accomplished to selectively control the flow of animal feed from the hopper space 23 through the conduit space 72a. In this way, additional flow control of feed may be accomplished by positioning the valve closure member 82 as desired, but a certain amount of flow control is also accomplished by the spacing of the distal end 73 of tube 72 from surface of wall 74w, as illustrated. The feeding apparatus 60 may be constructed in generally the same manner as the apparatus 20 and utilizing the same materials. The height above ground 19 of tubes 74 and 48 is preferably about 18 inches and about 36 inches, respectively (as measured from the ground to the bottom of tubes 74 and 48). Several components of apparatus 60 are or may be substantially identical to those of the apparatus 20.

Figure 7:
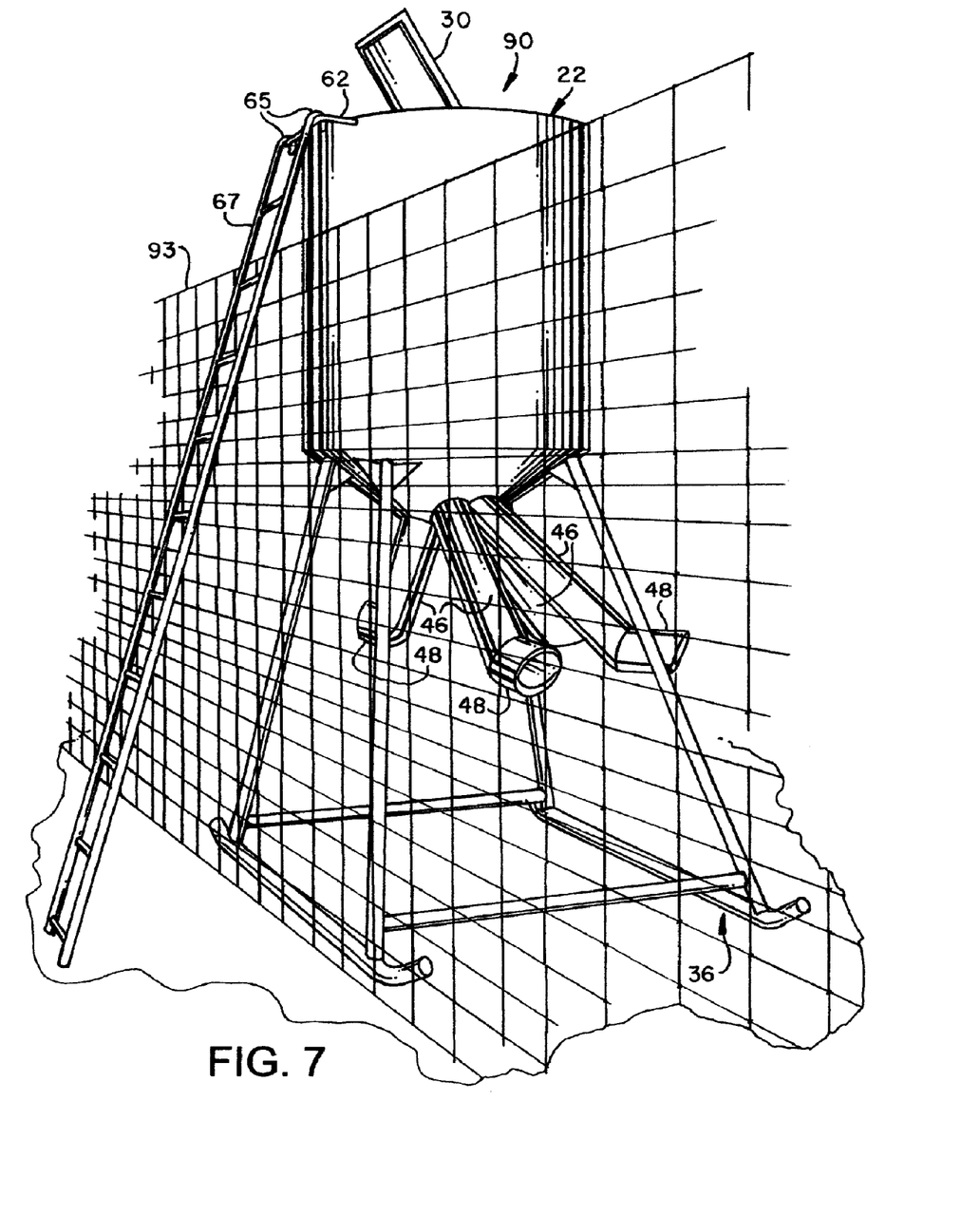
FIG. 7 is a perspective view of yet another preferred embodiment of an animal feeding apparatus in accordance with the invention.

Referring now to FIG. 7, there is illustrated still another preferred embodiment of the invention and generally designated by the numeral 90. The feeding apparatus 90 also utilizes or may utilize a hopper 22 and support skid assembly 36. However, a different arrangement of feeding tubes, comprising the feeding tube assemblies 46, 48 is provided and the orientation of the tubes is such that two tubes are disposed one hundred eighty degrees opposed to each other and two other tubes are oriented at forty-five degrees, respectively, from the first mentioned opposed tubes, generally as illustrated, or at some other selected angle extending basically to one side of the apparatus so that it may be placed against a confinement fence, such as the fence 93 shown in FIG. 7. Hopper 22 is also modified by placing the ladder support bail 62 at the upper end of the sidewall 24 whereby an access ladder 67, having respective distal hook portions 65 formed thereon, may be connected to the hopper 22 to provide access to the hatch or cover 30, shown in an open position in the illustration of FIG. 7.

Accordingly, the apparatus 90 enjoys all of the benefits of the apparatus 20 or the apparatus 60, but is adapted for placement against a confinement fence so that a person gaining access to the hopper 22 for replenishment of feed therein is not required to go into the interior of a breeding pen or other habitat delimited by the confinement fence 93. Those skilled in the art will recognize that the number of tube assemblies 46, 48 may be varied and selectively positioned as desired in a feeding apparatus according to the present invention.

Figure 8:
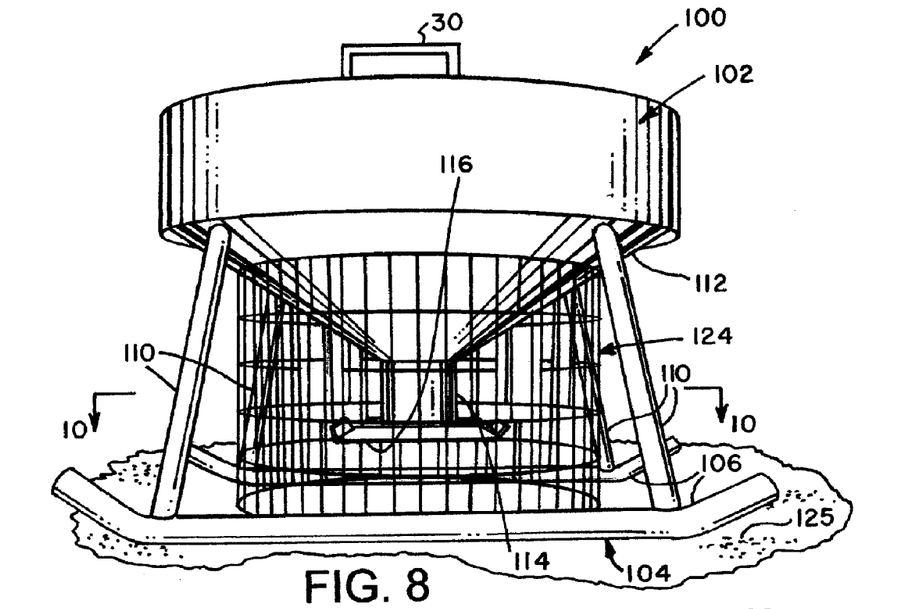
FIG. 8 is a side elevation of an animal feeding apparatus, particularly adapted for feeding wildfowl.
Figure 9:
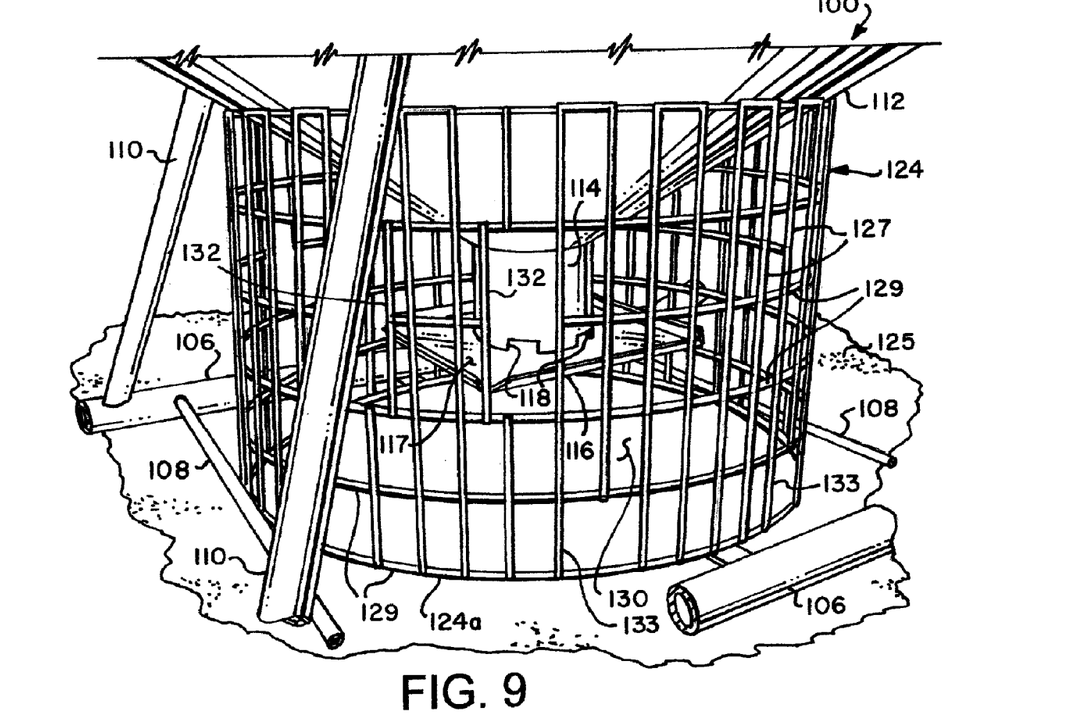
FIG. 9 is a detail perspective view illustrating certain features of the apparatus shown in FIG. 8.
Figure 10:
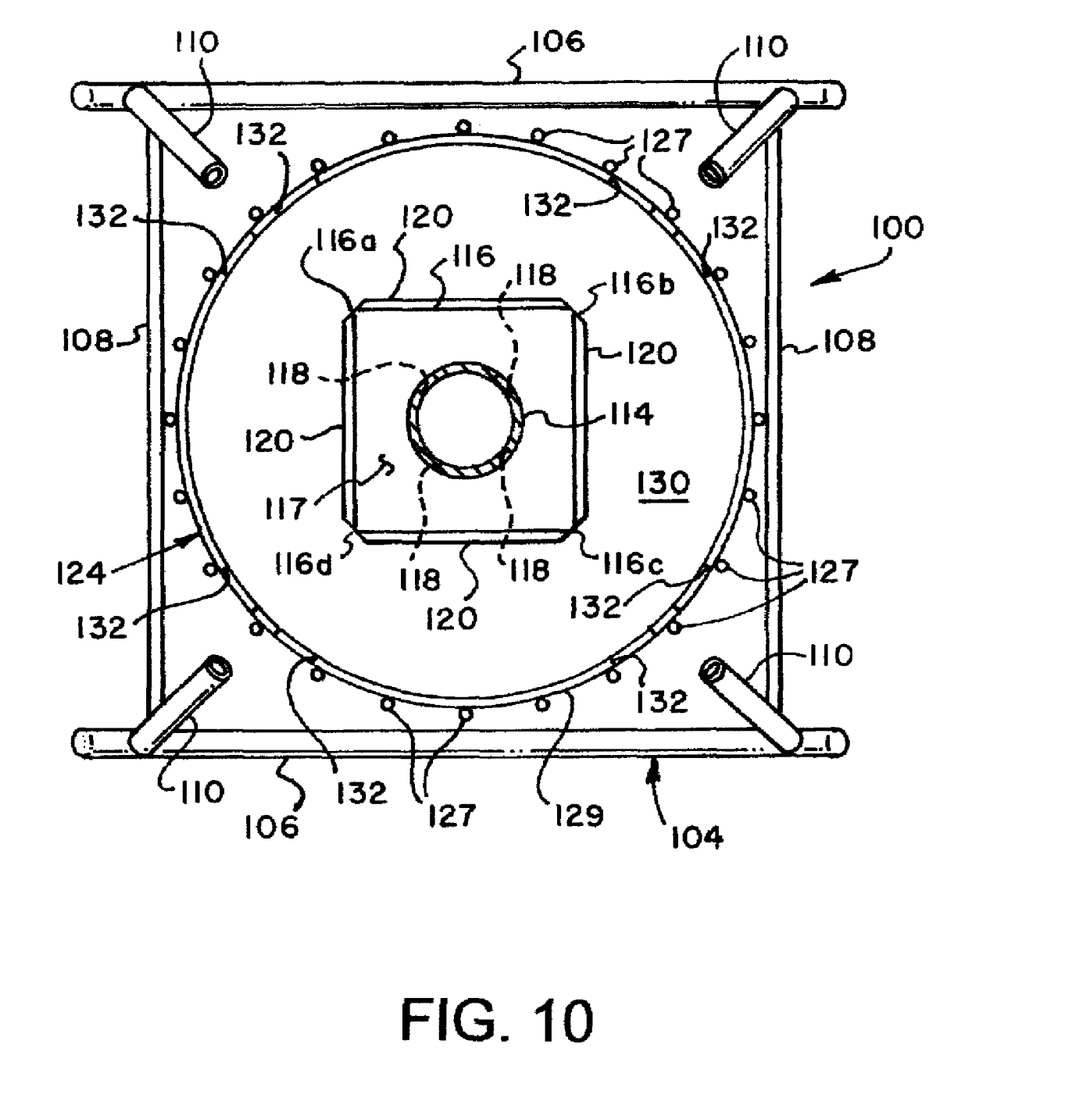
FIG. 10 is a section view taken generally along the line 10-10 of FIG. 8.

Referring now to FIGS. 8, 9 and 10, another preferred embodiment of a feeding apparatus in accordance with the invention is illustrated and generally designated by the numeral 100. Feeding apparatus 100 comprises a generally cylindrical feed reservoir or hopper 102 similar in some respects to the hopper 22, but being of an overall height somewhat less than that of the apparatuses 20 or 60, for example. Apparatus 100 is, for example, adapted for feeding various types of wildfowl, such as quail and wild turkey. Hopper 102 is supported on a skid assembly 104 including spaced apart parallel skid members 106 interconnected by transverse skid members 108, see FIGS. 9 and 10, and connected to upstanding tubular support legs 110 which are disposed in supportive relationship to the hopper 102. Hopper 102 includes a frustoconical depending bottom wall 112 and a central vertically depending feed supply tube 114 connected to bottom wall 112, FIGS. 8 and 9, also operable for dispensing feed onto a generally horizontal, flat feed dispensing plate 116 connected to the distal end of the tube. Tube 114 is provided with four circumferentially spaced feed dispensing ports 118, see FIGS. 9 and 10. Feed supply tube 114 is secured to feed dispensing plate 116 and flow of feed out of hopper 102 onto the surface 117 of feed dispensing plate 116 is controlled by the size and configuration of the ports 118. Four ports are shown in the embodiment of FIGS. 8 through 10 oriented at ninety degrees with respect to each other and aligned with opposed plate corners 116a, 116b, 116c and 116d, respectively, FIG. 10. Accordingly, feed suitable for wildfowl, such as quail and turkey, will flow from hopper 107 through tube 114 and out of the ports 118 onto the surface 117 of plate 116 relatively freely and will be metered in accordance with what is consumed of the feed lying on the surface 117 and adjacent the respective ports 118. Feed dispensing plate 116 is provided with circumferential upturned edge portions or flanges 120 which are oriented at an upward projecting angle of about sixty degrees with respect to the plane of plate 116 and are mitered at their opposite ends, as illustrated.

Referring still further to FIGS. 8 through 10, the apparatus 100 is provided with a limited access structure comprising a generally circular wire form cage 124 disposed around and spaced from the feed supply tube 114, the feed dispensing plate 116 and within the confines of skid assembly 104 and extending between the frustoconical bottom wall 112 and the earth's surface 125 on which the apparatus 100 is disposed, as illustrated. Cage 124 is characterized by a generally rectangular wire mesh, including vertical oriented wire members 127 spaced apart as shown, and horizontal wire members 129 also spaced apart as shown, to form a suitable grid. The dimensions of the openings in the grid formed by the members 127 and 129 are such as to limit access to the space 130, FIG. 10, within the confines of the cage 124 and between the ground 125 and the frustoconical bottom wall 112 of hopper 102. The grid spacing may be such as to allow access to space 130 by quail passing through the grid openings or through slightly enlarged openings 133, FIG. 9, spaced apart and formed at or between the two bottommost horizontal grid members 129 and selected ones of the vertical grid members 127. Still further, somewhat larger openings 132, FIGS. 9 and 10, may be formed by cutting away selected ones of the horizontal grid members 129, as illustrated, and at a predetermined distance above the bottom edge 124a of the cage 124 to allow access to the feed dispensing plate 116 by larger animals or fowl, such as turkeys. The positions of the openings 132 are preferably adjacent the corners of the feed dispensing plate 116 delimited by the mitered edges 116a, 116b, 116c and 116 d of the upturned edges or flanges 120 of the feed dispensing plate.

Accordingly, in use, the apparatus 100 is advantageous for feeding selected types of wildfowl, such as quail and turkey, for example. Thanks to the configuration of the apparatus 100, quail, for example, may gain access to the space 130 by moving between the grid members 127 and 129 through the openings 133 defined thereby and may perch on the flanges 120 while feeding from the surface 117. At the same time, larger fowl, such as turkey, may gain access to feed on the surface 117 of feed dispensing plate 116 by extending their necks through the openings 132 which are close to the corners of the feed dispensing plate 116. In this way, various types of wildfowl may gain access to feed dispensed by the apparatus 100 without being driven off by each other and while enjoying some security from attack by predators, particularly for animals or fowl which can gain access to the space 130.

The fabrication of the apparatus 100 may be carried out using essentially the same practices as for fabricating the apparatus 20, the apparatus 60 and the apparatus 90. That is, conventional metal fabrication techniques and materials may be used to fabricate the apparatus 100 as well as the other embodiments of the invention described herein.

Although preferred embodiments of the invention have been described in detail, those skilled in the art will recognize that various substitutions and modifications may be made without departing from the scope and spirit of the appended claims.

What is claimed is:

1. A gravity flow granular animal feed storage and dispensing apparatus comprising:
   a feed storage and dispensing hopper including a depending bottom wall, a sidewall and a top wall;
   support structure for supporting said hopper at an elevation above ground level;
   at least one feed supply tube depending from said bottom wall of said hopper;
   at least one feed dispensing tube operably connected to said at least one feed supply tube, said feed dispensing tube extending substantially horizontally from said at least one feed supply tube, said feed dispensing tube having an open distal end disposed at an elevation above ground level;
   a feed dispensing baffle operably connected to said feed dispensing tube, wherein said feed dispensing baffle prevents the continuous flow of feed out of said open distal end of said feed dispensing tube but provides sufficient space to allow an animal's muzzle to protrude into the open distal end of said feed dispensing tube to gain access to feed disposed therein, and
   a static flow control baffle interposed said hopper and said feed dispensing baffle, respectively, wherein said flow control baffle is attached directly to an interior wall part of at least one said feed supply tube and said feed dispensing tube, respectively, and depending into a flow path formed by said at least one feed dispensing tube and said at least one feed supply tube whereby at least about 50% of the flow path is open, and wherein said flow control baffle permits the continuous flow of feed through said at least one feed supply tube to said feed dispensing tube, wherein said feed dispensing baffle and said static flow control baffle are arranged such that as feed is depleted through consumption, more feed will flow past the static flow control baffle but not sufficiently as to flow over feed dispensing baffle and onto the ground;
   wherein said at least one feed dispensing tube is scarfed at an acute angle with a vertical axis to form a shield against rain or snow contaminating feed disposed in said at least one feed dispensing tube and to permit access to said feed disposed therein, wherein the vertical axis is defined by an imaginary vertical line drawn from a point just above the open distal end of said at least one feed dispensing tube to a point just below the open distal end of said at least one feeding dispensing tube, the line touching the outermost portion of the open distal end, wherein the acute angle is measured between the open distal end of the at least one feed dispensing tube and the vertical axis.

2. The apparatus set forth in claim 1 wherein:
   said apparatus includes plural inclined feed supply tubes depending from said bottom wall at an acute angle with respect to the horizontal and said apparatus includes plural horizontally extending feed dispensing tubes connected to said feed supply tubes, respectively, and each having an open distal end.

3. The apparatus set forth in claim 2 wherein:
   said apparatus includes plural feed dispensing baffles interposed said distal end of said feed dispensing tubes and said hopper, respectively, for preventing loss of feed through said distal end of said feed dispensing tubes.

4. The apparatus set forth in claim 3 wherein:
said apparatus includes plural flow control baffles interposed said hopper and said feed dispensing baffles, respectively.

5. The apparatus set forth in claim 4 wherein:
said flow control baffles depend from an upper wall part of at least one of said feed supply tubes and said feed dispensing tubes, respectively.

6. The apparatus set forth in claim 5 wherein:
said flow control baffles are disposed at a juncture of said feed supply tubes and said feed dispensing tubes, respectively.

7. The apparatus set forth in claim 2 wherein:
said feed dispensing tubes are scarfed at an acute angle with a vertical axis to form a shield against rain or snow contaminating feed disposed in said feed dispensing tubes and to permit access to said feed disposed therein, wherein the vertical axis is defined by an imaginary vertical line drawn from a point just above the open distal end of said feed dispensing tube to a point just below the open distal end of said feeding dispensing tube, the line touching the outermost portion of the open distal end, wherein the acute angle is measured between the open distal end of the feed dispensing tube and the vertical axis.

8. The apparatus set forth in claim 2 wherein:
said feed dispensing tubes include an enlarged distal end section for large muzzled animals to gain access to feed disposed in said feed dispensing tubes.

9. The apparatus set forth in claim 2 wherein:
said feed supply and dispensing tubes are arranged in an array of at least four dispensing tubes circumferentially spaced apart and depending from said bottom wall of said hopper.

10. The apparatus set forth in claim 9 wherein:
said feed supply and dispensing tubes are arranged projecting opposite each other and to one side of said hopper whereby said apparatus may be disposed against a confinement fence or wall while permitting access to said hopper to replenish feed therein.

11. The apparatus set forth in claim 9 including an access ladder
connected to said hopper to provide access to a top wall thereof to replenish feed in said hopper.

12. The apparatus set forth in claim 11 wherein:
said ladder is removably connected to said hopper by cooperating hook and bail members formed on said ladder on said hopper, respectively.

13. The apparatus set forth in claim 2 including:
a vertically depending feed supply tube depending below said inclined feed supply and dispensing tubes and at least one feed dispensing member connected to said vertical feed supply tube.

14. The apparatus set forth in claim 13 wherein:
said vertical feed supply tube is connected to plural opposed feed dispensing tubes for dispensing feed at an elevation above ground level less than the elevation of said inclined feed supply and dispensing tubes, respectively.

15. The apparatus set forth in claim 14 including:
a flow control valve disposed in said vertical feed supply tube for controlling flow of feed therethrough.

16. The apparatus set forth in claim 14 wherein:
said vertical feed supply tube includes a distal end spaced above a surface of said plural opposed feed dispensing tubes to provide a flow metering orifice for granular feed flowing from said vertical feed supply tube.

17. The apparatus set forth in claim 1 further comprising a vertically depending feed supply tube depending from said bottom wall of said hopper;
and at least one feed supply tube depending from said vertically depending feed supply tube.

18. The apparatus set forth in claim 1 further comprising support structure for elevating said hopper above ground level.

19. The apparatus set forth in claim 1, wherein the distal end of said at least one feed dispensing tube is elevated above ground level.

20. The apparatus set forth in claim 1 wherein said at least one feed dispensing tube comprises a first conduit segment having an upper and lower portion and forming an acute angle with the horizontal, and a second conduit segment which extends substantially horizontally from the lower portion of the first conduit segment and is substantially parallel with the horizontal, wherein the first conduit segment forms an angle with the horizontal in the range of from about 40 to about 50 degrees, and the second conduit segment has a open distal end that is scarfed.

21. The feed dispensing and supply system of claim 20, wherein the scarf of the distal end of the second conduit segment forms an angle with the vertical of about 25 degrees.

* * * * *